United States Patent
Olgaard et al.

(10) Patent No.: US 9,158,642 B2
(45) Date of Patent: Oct. 13, 2015

(54) METHOD OF TESTING MULTIPLE DATA PACKET SIGNAL TRANSCEIVERS CONCURRENTLY

(71) Applicant: LITEPOINT CORPORATION, Sunnyvale, CA (US)

(72) Inventors: Christian Volf Olgaard, Saratoga, CA (US); Erdem Serkan Erdogan, Sunnyvale, CA (US); Ruizu Wang, San Ramon, CA (US); Guang Shi, San Jose, CA (US)

(73) Assignee: LITEPOINT CORPORATION, Sunnyvale, CA (US)

( * ) Notice: Subject to any disclaimer, the term of this patent is extended or adjusted under 35 U.S.C. 154(b) by 2 days.

(21) Appl. No.: 13/721,210

(22) Filed: Dec. 20, 2012

(65) Prior Publication Data

US 2014/0181601 A1   Jun. 26, 2014

(51) Int. Cl.
| | | |
|---|---|---|
| *G06F 11/263* | (2006.01) | |
| *G06F 11/273* | (2006.01) | |
| *H04L 1/24* | (2006.01) | |
| *G06F 11/36* | (2006.01) | |
| *H04L 1/20* | (2006.01) | |

(52) U.S. Cl.
CPC ............ *G06F 11/2733* (2013.01); *H04L 1/24* (2013.01); *H04L 1/203* (2013.01); *H04L 1/244* (2013.01)

(58) Field of Classification Search
CPC ............ H04L 1/20; H04L 1/24; H04L 43/50; H04L 12/2697; H04L 1/0057; H04L 1/244; H04L 1/203; G06F 11/221; G06F 11/2007; G06F 11/2733
See application file for complete search history.

(56) References Cited

U.S. PATENT DOCUMENTS

| | | | | |
|---|---|---|---|---|
| 5,721,762 | A * | 2/1998 | Sood ............................ | 455/466 |
| 5,764,651 | A * | 6/1998 | Bullock et al. ............... | 714/708 |
| 2003/0142737 | A1 | 7/2003 | Tarng | |
| 2004/0022176 | A1* | 2/2004 | Hashimoto et al. .......... | 370/204 |
| 2006/0195747 | A1 | 8/2006 | Pramanick et al. | |
| 2008/0205889 | A1* | 8/2008 | Aoki .............................. | 398/51 |
| 2010/0008237 | A1 | 1/2010 | Olgaard et al. | |
| 2011/0069624 | A1 | 3/2011 | Olgaard | |

FOREIGN PATENT DOCUMENTS

WO    2011127973 A1    10/2011

OTHER PUBLICATIONS

International Search Report and Written Opinion Dated Jan. 20, 2014 for PCT/US2013/063053.
International Preliminary Report on Patentability filed in PCT/US2013/063053 dated Jun. 23, 2015, 6 pages.

* cited by examiner

*Primary Examiner* — April Y Blair
*Assistant Examiner* — Dipakkumar Gandhi
(74) *Attorney, Agent, or Firm* — Vedder Price, P.C.

(57) ABSTRACT

A method of testing, such as for a bit error rate (BER), of multiple data packet signal transceivers during which a tester and the data packet signal transceivers exchange sequences of test data packets and summary data packets. The tester provides the test data packets which contain respective pluralities of data bits with respective predetermined bit patterns. Responsive thereto, the data packet signal transceivers provide the summary data packets which contain respective summary data indicative of the number of data bits with the respective predetermined bit patterns that are correctly received by corresponding ones of the data packet signal transceivers.

12 Claims, 6 Drawing Sheets

METHOD OF TESTING MULTIPLE DATA PACKET SIGNAL TRANSCEIVERS CONCURRENTLY

BACKGROUND

The present invention relates to methods for testing multiple data packet signal transceivers in parallel, and in particular, to testing such devices under test (DUTs) using frequency hopping spread spectrum signal technologies, including Bluetooth technology.

Wireless devices featuring Bluetooth connectivity technology have become increasingly ubiquitous. Such devices are tested during manufacturing to ensure that they are operational and meet standards-prescribed signal characteristics that ensure proper operation and minimal interference with other Bluetooth devices as well other wireless devices operating in accordance with other wireless signal technologies. Such testing is intended primarily to identify manufacturing defects in the devices during large volume production.

Consumer products featuring wireless technologies, such as smartphones, laptops and tablets, are highly sophisticated devices that are produced and sold in very large numbers in markets noted for extreme pricing and cost pressures. Manufacturing test is a key area of concern with regard to cost containment. With no compromises allowed in the quality of test results, test system designers must cut no corners when it comes to accuracy in test results, but must also work to reduce required test times for testing the various wireless technologies.

Bluetooth wireless technology is found in a great variety of consumer products. An overarching standard governs the signal characteristics, such as frequency spectrum, modulation characteristics and power levels, to which Bluetooth equipped devices must adhere. Within the bounds provided by this standard, Bluetooth device makers constantly work to reduce the costs of building and testing in accordance with this technology.

One of the areas of focus for a cost containment is concurrent (e.g., parallel or simultaneous) testing of Bluetooth devices. The most direct way to achieve concurrent testing is to test multiple devices with multiple concurrently operating test systems, or testers, with each such system equipped with the means for testing the capabilities of a device for transmission and reception of Bluetooth-specified signal characteristics (e.g., adherence to the prescribed frequency spectrum, modulation characteristics and quality, power levels, sensitivity, etc.). However, the capital cost of having one tester dedicated for each tested device, or DUT is high. Therefore, test system designers using a single test system having a single signal source and single received signal analyzer have made use of signal splitters and multiplexors to accommodate multiple DUTs with a single tester.

However, significant compromises are required to achieve the cost savings to be realized when avoiding the need for a tester for each DUT. For example, whereas one can use signal splitter functions to replicate a single source signal concurrently, received signals cannot be examined concurrently by a single received signal analyzer. Instead, such signals need to be multiplexed and captured successively rather than concurrently.

The challenge, therefore, is how to optimize test speed and minimize tests costs, and do so while using test systems where the number of signal sources and received signal analyzers is less than one-to-one with the number of DUTs to be tested concurrently.

SUMMARY

In accordance with the presently claimed invention, a method is provided for testing, such as for a bit error rate (BER), of multiple data packet signal transceivers during which a tester and the data packet signal transceivers exchange sequences of test data packets and summary data packets. The tester provides the test data packets which contain respective pluralities of data bits with respective predetermined bit patterns. Responsive thereto, the data packet signal transceivers provide the summary data packets which contain respective summary data indicative of the number of data bits with the respective predetermined bit patterns that are correctly received by corresponding ones of the data packet signal transceivers.

In accordance with an exemplary embodiment of the presently claimed invention, a method of testing multiple data packet signal transceivers includes: providing, for a plurality of data packet signal transceivers, a like plurality of test data packet signals replicating a common test data packet signal that includes a plurality of sequential test data packets containing respective pluralities of data bits with respective predetermined bit patterns; and receiving, from said plurality of data packet signal transceivers, a like plurality of summary data packet signals, wherein each one of said plurality of summary data packet signals is responsive to a respective one of said plurality of test data packet signals and includes a plurality of sequential summary data packets containing respective summary data indicative of a number of bits of said pluralities of data bits with said respective predetermined bit patterns correctly received by a corresponding one of said plurality of data packet signal transceivers.

In accordance with another exemplary embodiment of the presently claimed invention, a method of testing multiple data packet signal transceivers includes: receiving, with a plurality of data packet signal transceivers, a like plurality of test data packet signals replicating a common test data packet signal that includes a plurality of sequential test data packets containing respective pluralities of data bits with respective predetermined bit patterns; and providing, with said plurality of data packet signal transceivers, a like plurality of summary data packet signals, wherein each one of said plurality of summary data packet signals is responsive to a respective one of said plurality of test data packet signals and includes a plurality of sequential summary data packets containing respective summary data indicative of a number of bits of said pluralities of data bits with said respective predetermined bit patterns correctly received by a corresponding one of said plurality of data packet signal transceivers.

DETAILED DESCRIPTION

The following detailed description is of example embodiments of the presently claimed invention with references to the accompanying drawings. Such description is intended to be illustrative and not limiting with respect to the scope of the present invention. Such embodiments are described in sufficient detail to enable one of ordinary skill in the art to practice the subject invention, and it will be understood that other embodiments may be practiced with some variations without departing from the spirit or scope of the subject invention.

Throughout the present disclosure, absent a clear indication to the contrary from the context, it will be understood that individual circuit elements as described may be singular or plural in number. For example, the terms "circuit" and "circuitry" may include either a single component or a plurality of components, which are either active and/or passive and are connected or otherwise coupled together (e.g., as one or more integrated circuit chips) to provide the described function. Additionally, the term "signal" may refer to one or more currents, one or more voltages, or a data signal. Within the drawings, like or related elements will have like or related alpha, numeric or alphanumeric designators. Further, while the present invention has been discussed in the context of implementations using discrete electronic circuitry (preferably in the form of one or more integrated circuit chips), the functions of any part of such circuitry may alternatively be implemented using one or more appropriately programmed processors, depending upon the signal frequencies or data rates to be processed. Moreover, to the extent that the figures illustrate diagrams of the functional blocks of various embodiments, the functional blocks are not necessarily indicative of the division between hardware circuitry.

The following discussion involves concurrent testing of four DUTs. However, as will be readily appreciated, the systems, techniques and principles as discussed below for testing multiple DUTs concurrently in accordance with exemplary embodiments of the presently claimed invention can be scaled up or down for other multiples of DUTs. In other words, two or more DUTs can be tested concurrently in accordance with the presently claimed invention.

Figure 1:
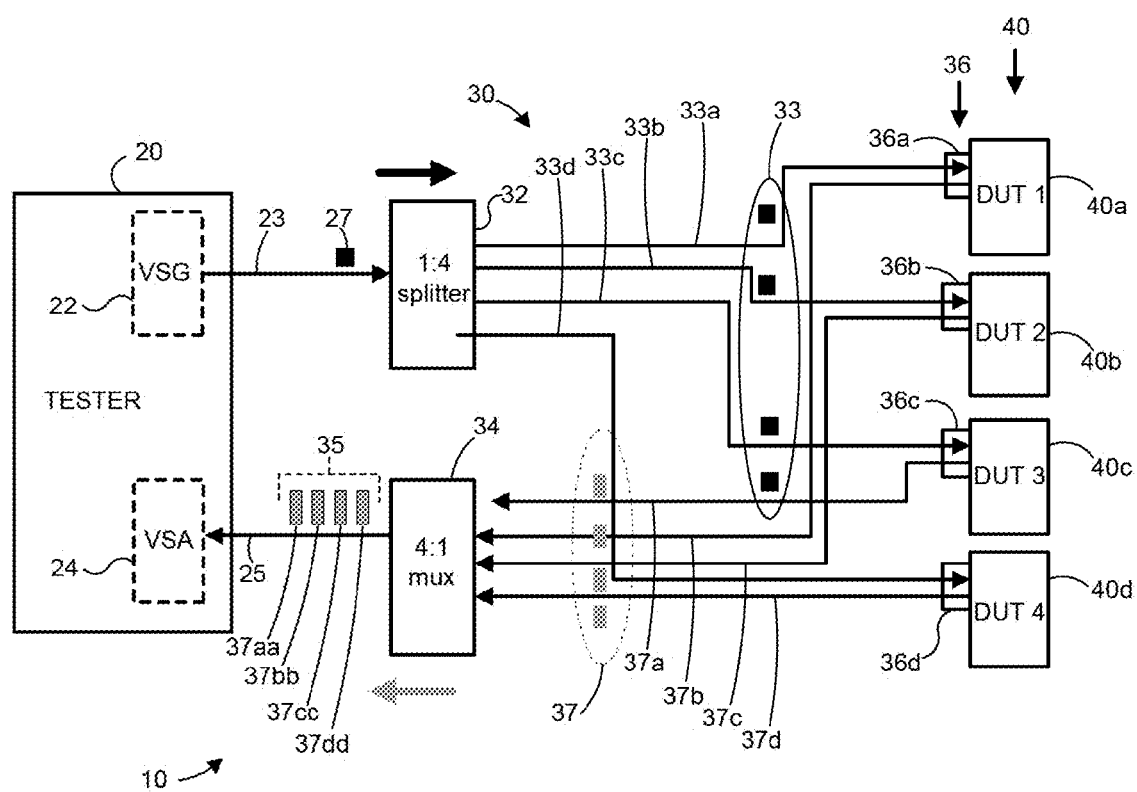
FIG. 1 depicts a test environment for testing multiple data packet signal transceivers concurrently in accordance with exemplary embodiments of the presently claimed invention.

Referring to FIG. 1, a test environment 10 for testing multiple DUTs in accordance with an exemplary embodiment of the presently claimed invention includes a tester 20, which includes a signal source 22 (e.g., a vector signal analyzer, VSG) and a received signal analyzer 24 (e.g., a vector signal analyzer, VSA), first signal routing circuitry 32 (e.g., signal dividing or splitting circuitry), second signal routing circuitry 34 (e.g., signal switching or multiplexing circuitry), third signal routing circuitry 36 (e.g., signal switching circuitry or a combination of signal dividing and combining circuitry), and the DUTs 40 to be tested, interconnected substantially as shown. As will be readily appreciated, the DUTs 40 are typically wireless signal transceivers, but the various signal paths between the tester 20 and the DUTs are typically cabled signal paths to ensure reliable and substantially lossless signal connections.

As depicted here in this example, the tester 20 includes the signal source 22 and signal analyzer 24, while external circuitry 30 includes the signal routing circuits 32, 34, 36 and any necessary signal connections (e.g., cables and connectors). Accordingly, the complete test system (e.g., absent any external controller (not shown) that may be desired or necessary) includes the tester 20 and external test circuitry 30. However, as will be readily appreciated, a tester can include both the functions and circuitry of the tester 20 and external test circuitry 30.

As is well known in the art, the VSG 22 provides a source signal 23 containing data packets 27, which is replicated by the first signal routing circuitry 32 to provide replicated source signals 33 for reception by the DUTs 40. The respective replicated source signals 33*a*, 33*b*, 33*c*, 33*d* are conveyed to corresponding DUTs 40*a*, 40*b*, 40*c*, 40*d* via the third signal routing circuits 36*a*, 36*b*, 36*c*, 36*d* (discussed in more detailed below). In response to the replicated source signals 33 (discussed in more detail below), the DUTs 40*a*, 40*b*, 40*c*, 40*d* provide response signals 37, with the respective response signals 37*a*, 37*b*, 37*c*, 37*d* being routed by the second routing circuitry 34 to provide the receive signal 25 for the VSA 24. As discussed in more detail below, respective data packets 37*aa*, 37*bb*, 37*cc*, 37*dd* from different time slots within the responsive signals 37*a*, 37*b*, 37*c*, 37*d* form a group of data packets 35 provided as the receive signal 25.

Figure 2:
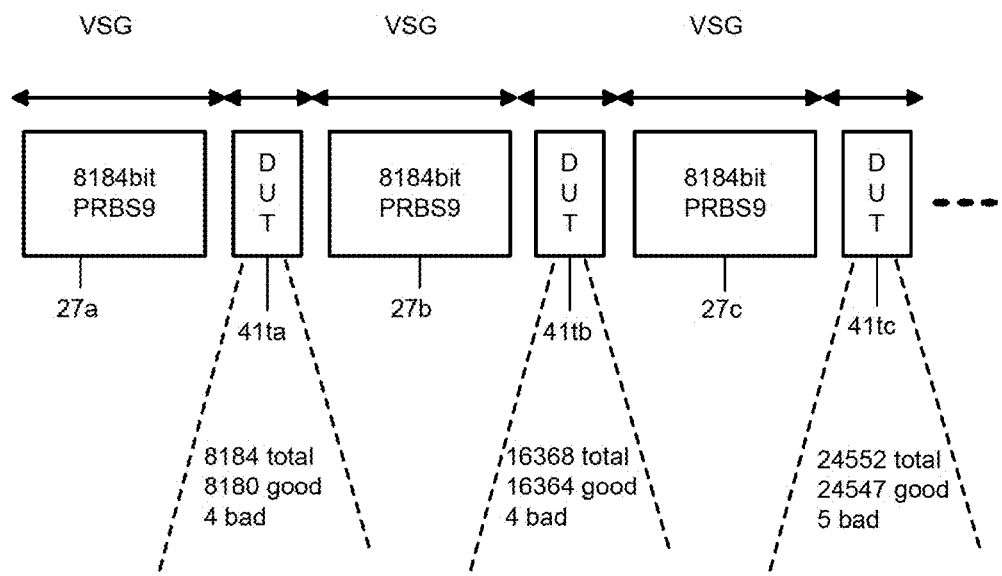
FIG. 2 depicts an exchange of sequences of test data packets and summary data packets between a tester and a DUT in accordance with an exemplary embodiment of the presently claimed invention.

Referring to FIG. 2, in accordance with an exemplary embodiment of the presently claimed invention, the tester 20 provides a transmit signal 23 containing standard-prescribed data packets (e.g., 8184-bit PRBS9 in accordance with the Bluetooth standard) and the DUTs 40 respond with shorter summary data packets 41*t*, ones that require only a signal time slot rather than the typical five time slots that would be otherwise required when performing a full data packet loop back test. Consequently, the overall test time can be reduced by 40% because the time spent on the loop back return data packets is reduced by 80% (e.g., one time slot versus five time slots for each set of return data packets). Each summary data packet 41*t* contains data indicative of the bit error rate (BER) computed by the respective DUT 40*a*, 40*b*, 40*c*, 40*d*, with each successive summary data packet 40*t* containing data indicative of a cumulative BER.

Hence, the test signal 23 (which, as discussed above, is replicated to provide multiple test signals 33) includes a sequence of test data packets 27*a*, 27*b*, 27*c*, . . . , to each of which each of the DUTs 40 responds with a respective summary data packet 41*ta*, 41*tb*, 41*tc*, . . . , each of which contains data indicative of the cumulative BER as determined internally by each DUT 40*a*, 40*b*, 40*c*, 40*d* (discussed in more detail below).

As will be readily appreciated, this saves a significant amount of test time when compared to the normal full data packet loop back test where the test data packets 27*a*, 27*b*, 27*c*, . . . , would each need to be received, replicated and transmitted in return by the DUTs 40 for reception by the tester 20, with the tester 20 then comparing the replicated data packets it received with those that were transmitted so as to compute the BER for each DUT 40*a*, 40*b*, 40*c*, 40*d*. In accordance with the presently claimed invention, however, each DUT 40*a*, 40*b*, 40*c*, 40*d* has been programmed or is otherwise provided with knowledge of the contents of the test data packets and computes its own internal BER (discussed in more detail below), which is then transmitted back to the tester 20 in the form of a summary data packet 41t that provides data indicative of the BER (e.g., data representing the total number of bits received, the number of valid bits received and the number of invalid bits received). Further, in accordance with the presently claimed invention, with each successive received test data packet, each DUT 40a, 40b, 40c, 40d computes its cumulative BER and provides this cumulative BER data in the next successive summary data packet returned to the tester 20.

Figure 3:
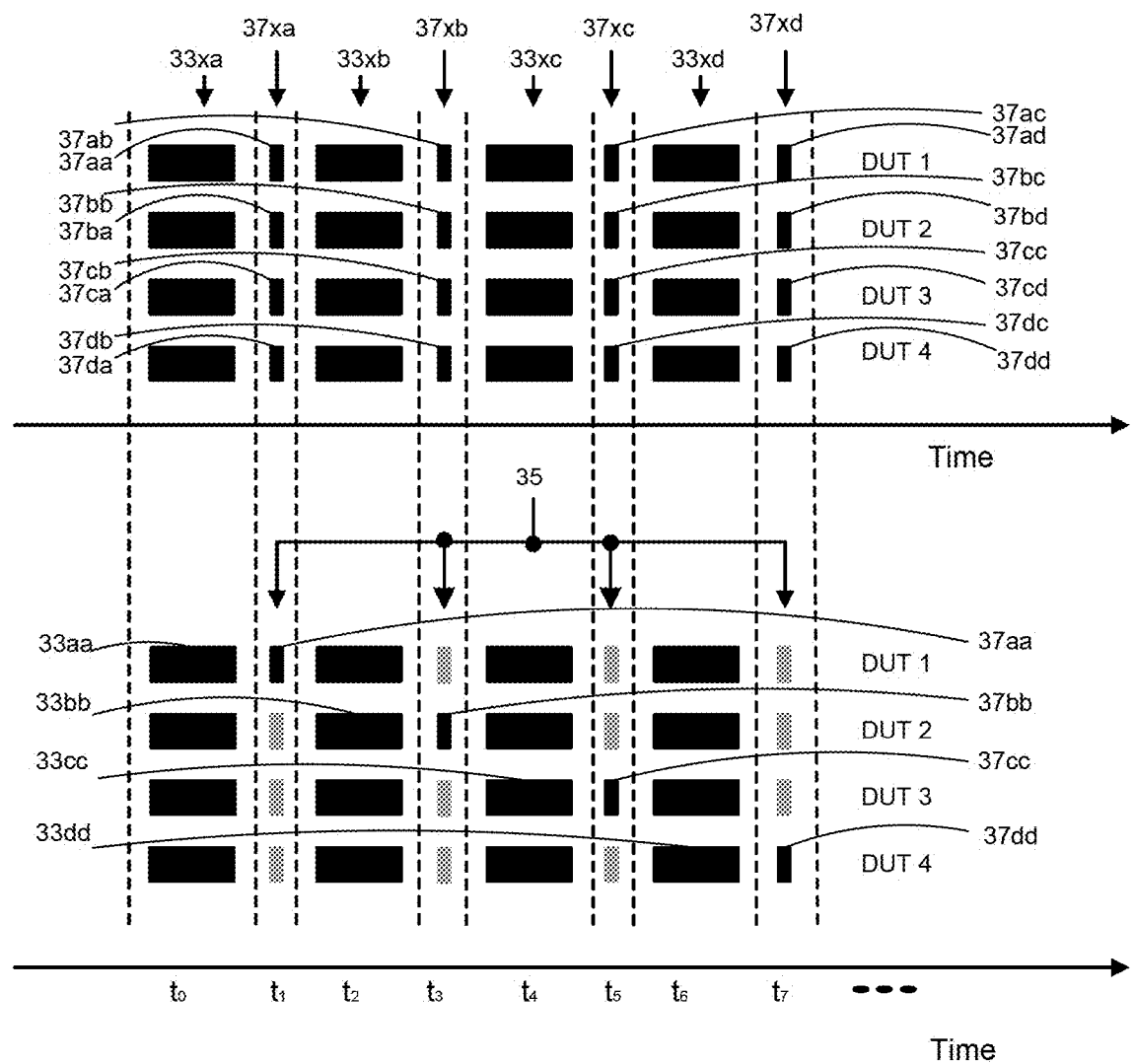
FIG. 3 depicts in more detail timing relationships among the exchanged test data packets and summary data packets in accordance with an exemplary embodiment of the presently claimed invention.

Referring to FIG. 3, as discussed above, standard-prescribed test data packets 33 (33xa, 33xb, 33xc, 33xd, ..., where "x" represents the respective replicated signals 33a, 33b, 33c, 33d) are provided by the tester 20 and the DUTs 40 respond with corresponding summary data packets 37 (37xa, 37xb, 37xc, 37xd, ...) during respective, successive time slots $t_0, t_1, t_2, t_3, t_4, t_5, t_6, t_7, \ldots$. As discussed above (FIG. 1), the return summary data packets 37 from the DUTs 40 are routed (e.g., multiplexed or switched by the second routing circuitry 34) to provide a sequence 35 of summary data packets 37aa, 37bb, 37cc, 37dd, ..., with one summary data packet 37xx from each DUT 40 (where the second where "x" represents successive return data packet time slots a, b, c, d, ...). In other words, for this example of four DUTs 40, in response to the first 33aa, second 33bb, third 33cc and fourth 33dd replicated test data packets received by the DUTs 40 during time intervals $t_0, t_2, t_4$ and $t_6$, respectively, first 37aa, second 37bb, third 37cc and fourth 37dd summary data packets returned from the first 40a, second 40b, third 40c and fourth 40d DUTs, respectively, are provided as part of the sequence 35 of returned summary data packets provided to the tester 20.

Figure 4:
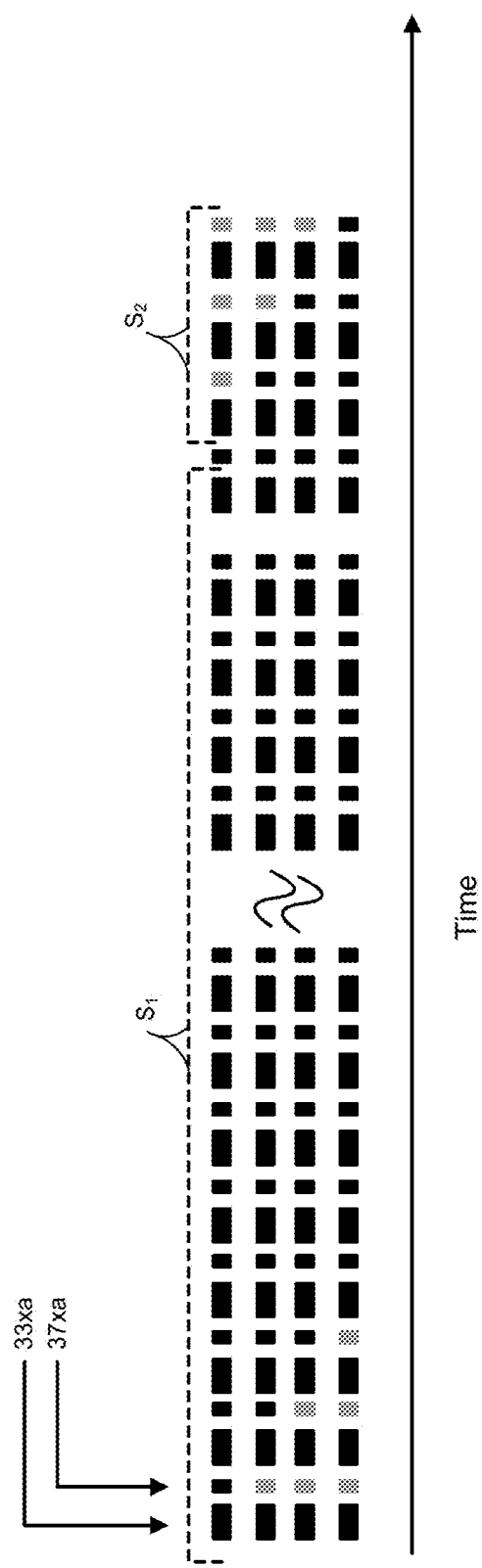
FIG. 4 depicts another series of sequences of exchanged test data packets and summary data packets in accordance with an exemplary embodiment of the presently claimed invention.

Referring to FIG. 4, as discussed above, test data packets 33xx and summary data packets 37xx are exchanged between the tester 20 and DUTs 40. In accordance with an exemplary embodiment of the presently claimed invention, this exchange of data packets 33xx, 37xx is performed during the first test sub-sequence interval $S_1$. At the end of this test interval $S_1$, the tester 20 will have provided a predetermined number of BER test data packets 33xx to the DUTs 40 concurrently, in response to which the DUTs 40 will have provided BER summary data packets 37xx, as discussed above. The end of this test interval $S_1$ occurs when the tester 20 has determined that the predetermined number of test data packets 33xx has been sent and received by the DUTs 40. At this point, another test sub-sequence interval $S_2$ begins with the tester 20 sending a new sequence of test data packets 33xx for reception by the DUTs 40 and reception by the tester 20 of the responsive summary data packets 37xx indicative of the new, and cumulative, BER as measured by each respective DUT 40a, 40b, 40c, 40d. This second test interval $S_2$ can be performed with the test data packets 33xx being transmitted with one or more different signal characteristics (e.g., signal frequency, signal modulation type or data rate). This advantageously allows BER testing to be performed for different signal characteristics, e.g., all prescribed data rates, in a single sequence comprised of multiple sub-sequences $S_1, S_2, \ldots$, as discussed above. As BER is calculated over a minimum number of data bits, a tester 20 can monitor the accumulating bit count until such minimum count is achieved for one DUT 40, and then move on to the next DUT 40, and so on (since using more data bits does not affect the BER calculation).

Figure 5:
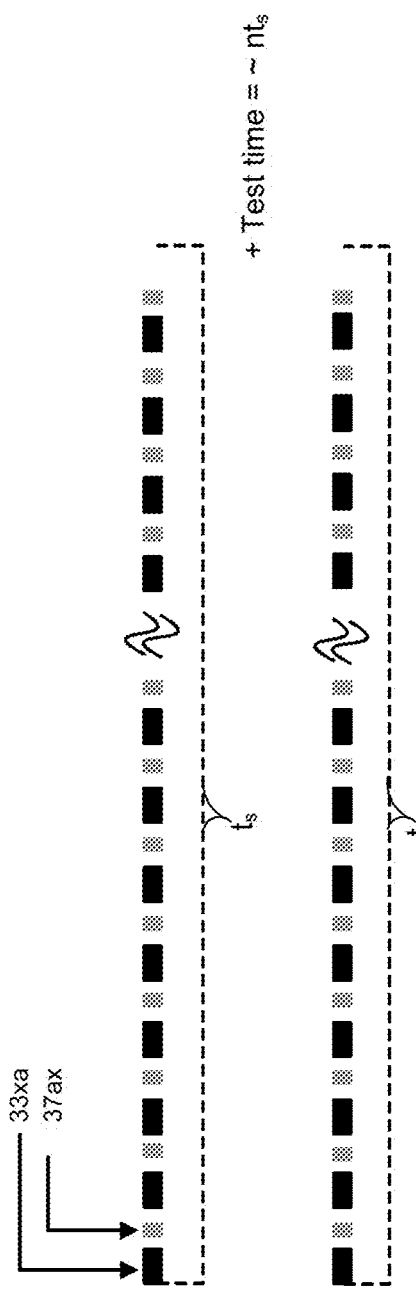
FIG. 5 depicts test time savings that can be realized by using sequences of test data packets and summary data packets in accordance with an exemplary embodiment of the presently claimed invention.

Referring to FIG. 5, in accordance with an exemplary embodiment of the presently claimed invention, use of summary data packets 37xx responsive to the test data packets 33xx can significantly reduce test time, even when testing only one DUT 40 at a time (e.g., sequential testing). Use of summary data packets 37xx, as discussed above, provide a test time reduced by approximately 80% for each summary data packet 37xx return, versus a full data packet loop back test, and a 40% reduction in test time overall. For example, if a test time for each DUT 40 is $t_s$, then the test time for testing n DUTs would be approximately the product of n and $t_s$ ($n*t_s$).

Figure 6:
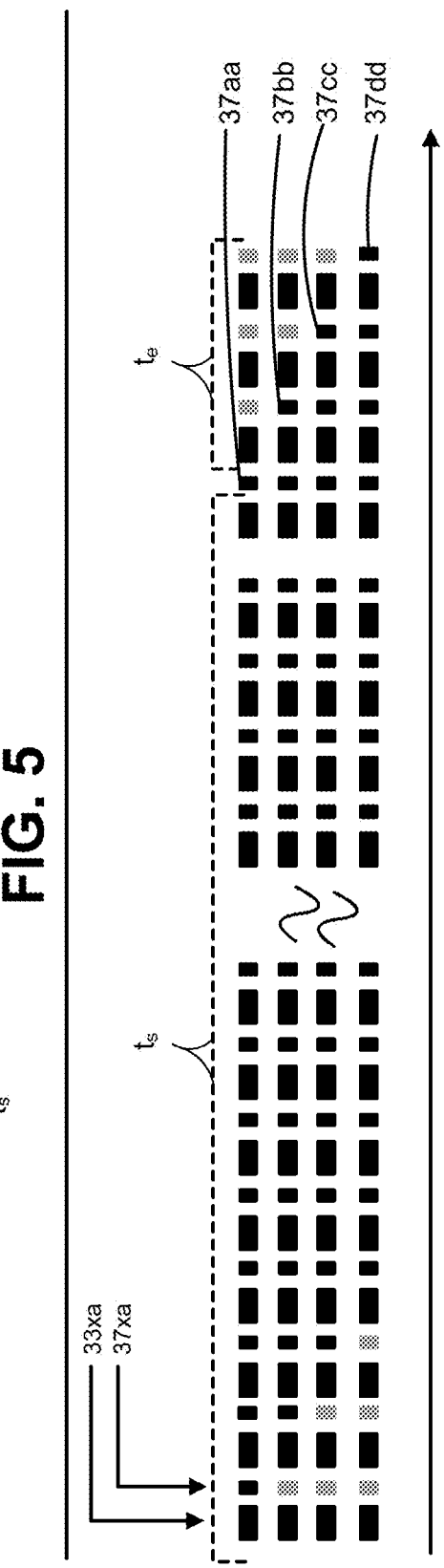
FIG. 6 depicts how further time savings can be realized by combining exchanges of sequences of test data packets and summary data packets with testing multiple DUTs concurrently in accordance with an exemplary embodiment of the presently claimed invention.

Referring to FIG. 6, in accordance with another exemplary embodiment of the presently claimed invention, by testing such n DUTs 40 concurrently, the overall test time becomes $t_s$ plus the extra time $t_e$ required for routing (e.g., multiplexing or switching) the subsequent cumulative BER summary data packets 37xx. However, such additional test time $t_e$ is substantially shorter than the original initial test time L. Accordingly, since the overall test time $t_s+t_e$ remains approximately equal to $t_s$ (where $t_s \gg t_e$), when testing n DUTs 40 concurrently, a BER test of each DUT 40 would require a test time of approximately $t_s/n$.

Figure 7:
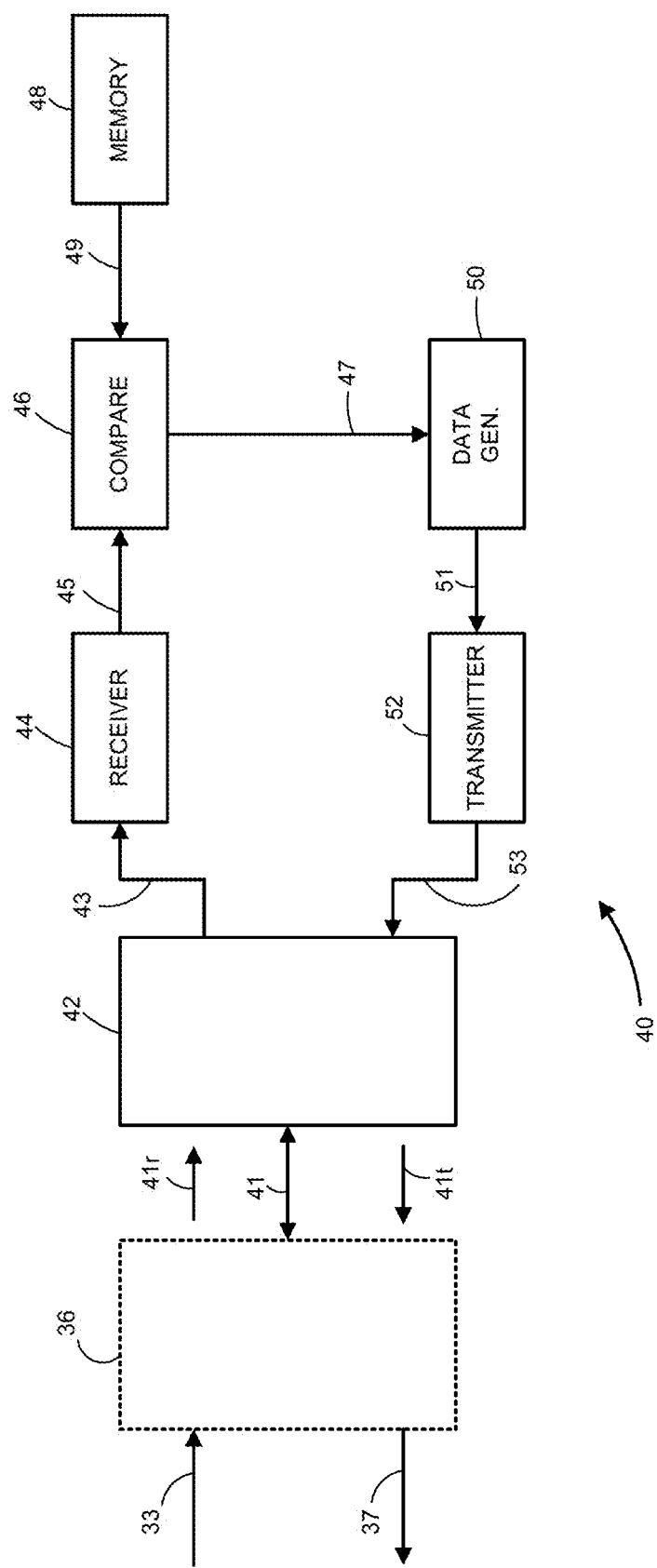
FIG. 7 depicts, in functional block diagram form, how a DUT provides summary data packets to be transmitted in response to reception of test data packets in accordance with an exemplary embodiment of the presently claimed invention.

Referring to FIG. 7, in accordance with an exemplary embodiment, each DUT 40 includes signal routing circuitry 42 (e.g., a combination of signal splitting and combining circuitry), receiver circuitry 44, data comparison circuitry 46, memory circuitry 48 (or some other data source such as remote access to external memory, etc.), data generator circuitry 50 and transmitter circuitry 52, interconnected substantially as shown. Also shown for purposes of this discussion, though not included normally as part of a DUT 40, is the third signal routing circuitry 36 for providing the received test data packet 33 as the received signal 41r and providing the internally generated summary data packets 41t as the return summary data packets 37. (Typically, internal to the DUT 40, a single wired signal path 41 is used to convey these received 41r and transmitted 41t signals.)

The incoming test data packet signal 43 is received and processed by the receiver circuitry 44, which provides received data bits 45 to the data comparison circuitry 46. The data comparison circuitry 46 also receives, from the memory circuitry 48, data 49 representing the test data bits expected to be received during the subject time interval (e.g., test sub-sequences $S_1, S_2, \ldots$, as discussed above). A comparison of the received 45 and expected 49 data bits results in data 47 representing a BER computation indicative of the numbers of valid and invalid data bits received. This computed data 47 is used by the data generator circuitry 50 to provide summary data 51 indicative of the measured BER. The transmitter circuitry 52 converts this summary data 51 (e.g., via signal modulation and frequency conversion in accordance with well-known principles and techniques) to provide a summary data packet signal 53 for return to the tester 20 (FIG. 1).

Various other modifications and alterations in the structure and method of operation of this invention will be apparent to those skilled in the art without departing from the scope and the spirit of the invention. Although the invention has been described in connection with specific preferred embodiments, it should be understood that the invention as claimed should not be unduly limited to such specific embodiments. It is intended that the following claims define the scope of the present invention and that structures and methods within the scope of these claims and their equivalents be covered thereby.

What is claimed is:

1. A method of testing multiple data packet signal transceivers, comprising:

providing, for a plurality of data packet signal transceivers, a like plurality of test data packet signals replicating a common test data packet signal that includes a plurality of sequential test data packets containing respective pluralities of data bits with respective predetermined bit patterns; and receiving, from said plurality of data packet signal transceivers, a like plurality of summary data packet signals, wherein each one of said plurality of summary data packet signals is responsive to a respective one of said plurality of test data packet signals and includes a plurality of sequential summary data packets containing respective summary data indicative of a number of bits of said pluralities of data bits with said respective predetermined bit patterns correctly received by a corresponding one of said plurality of data packet signal transceivers, wherein temporally adjacent ones of said plurality of sequential summary data packets originate from different ones of said plurality of data packet signal transceivers.

2. The method of claim 1, wherein each one of said plurality of sequential summary data packets is responsive to a respective one of said plurality of sequential test data packets.

3. The method of claim 1, wherein successive ones of said plurality of sequential summary data packets contains summary data indicative of a cumulative number of bits of said pluralities of data bits with said respective predetermined bit patterns correctly received by a corresponding one of said plurality of data packet signal transceivers.

4. The method of claim 1, wherein said respective summary data is further indicative of a BER for a corresponding one of said plurality of data packet signal transceivers.

5. The method of claim 4, wherein successive ones of said plurality of sequential summary data packets contains summary data indicative of a cumulative BER.

6. The method of claim 1, wherein said common test data packet signal includes a plurality of data rates.

7. A method of testing multiple data packet signal transceivers, comprising:
receiving, with a plurality of data packet signal transceivers, a like plurality of test data packet signals replicating a common test data packet signal that includes a plurality of sequential test data packets containing respective pluralities of data bits with respective predetermined bit patterns; and providing, with said plurality of data packet signal transceivers, a like plurality of summary data packet signals, wherein each one of said plurality of summary data packet signals is responsive to a respective one of said plurality of test data packet signals and includes a plurality of sequential summary data packets containing respective summary data indicative of a number of bits of said pluralities of data bits with said respective predetermined bit patterns correctly received by a corresponding one of said plurality of data packet signal transceivers, wherein temporally adjacent ones of said plurality of sequential summary data packets originate from different ones of said plurality of data packet signal transceivers.

8. The method of claim 7, wherein each one of said plurality of sequential summary data packets is responsive to a respective one of said plurality of sequential test data packets.

9. The method of claim 7, wherein successive ones of said plurality of sequential summary data packets contains summary data indicative of a cumulative number of bits of said pluralities of data bits with said respective predetermined bit patterns correctly received by a corresponding one of said plurality of data packet signal transceivers.

10. The method of claim 7, wherein said respective summary data is further indicative of a BER for a corresponding one of said plurality of data packet signal transceivers.

11. The method of claim 10, wherein successive ones of said plurality of sequential summary data packets contains summary data indicative of a cumulative BER.

12. The method of claim 7, wherein said common test data packet signal includes a plurality of data rates.

* * * * *